Knapp & Libby,
Cultivator

No. 99,208.  Patented Jan. 25, 1870.

Witnesses.
O. E. Woodbury.
A. D. Libby.

Inventors
Samuel L. Libby
Joseph G. Knapp.

UNITED STATES PATENT OFFICE.

JOSEPH G. KNAPP, OF MADISON, AND SAMUEL D. LIBBY, OF BLOOMING GROVE, WISCONSIN.

IMPROVEMENT IN CULTIVATORS.

Specification forming part of Letters Patent No. 99,208, dated January 25, 1870.

*To all whom it may concern:*

Be it known that we, JOSEPH G. KNAPP, of the city of Madison, in the county of Dane, in the State of Wisconsin, and SAMUEL D. LIBBY, of the town of Blooming Grove, in the same county and State, have invented new and useful Improvements in Cultivators, particularly adapted for the cultivation of roots, strawberries, and cotton, as well as corn and other field-crops, of which the following is a full, clear, and exact description of the construction and operation of the same, reference being had to the annexed drawings, making a part of this description, in which—

Figure 1:
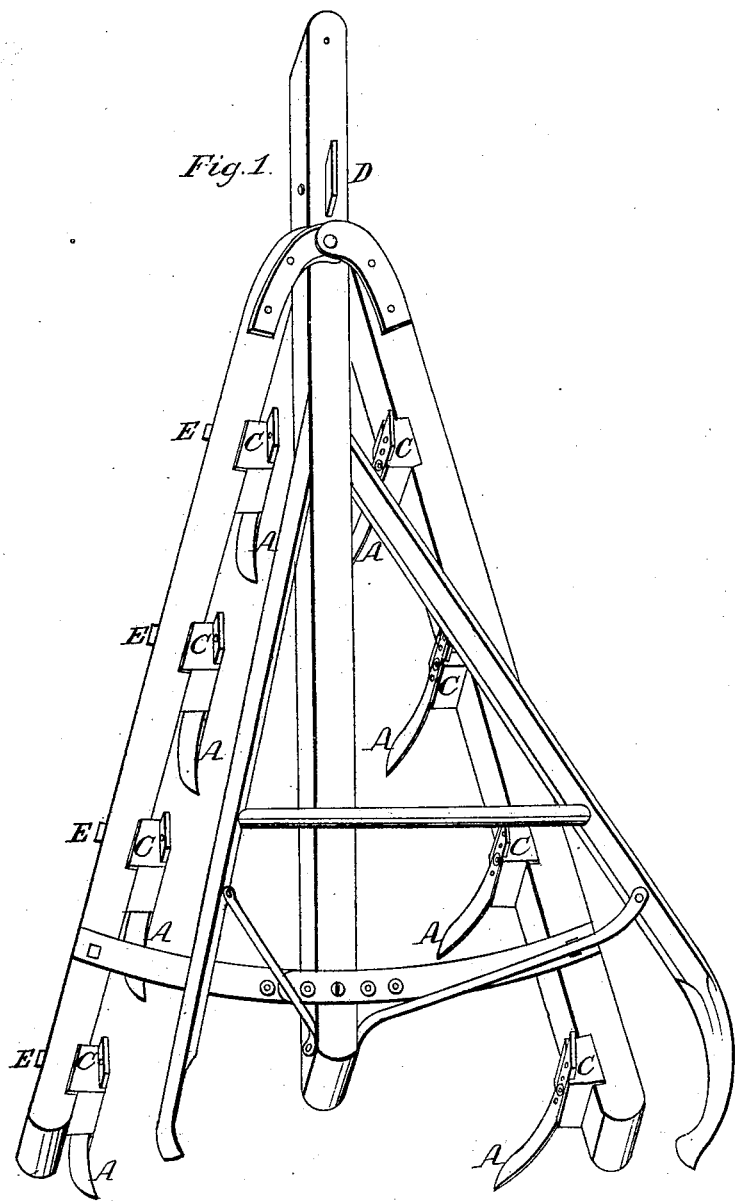
Figure 2:
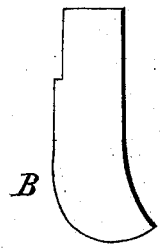

Figure 1 is a perspective view of the cultivator, showing the side knives or teeth and the manner they are attached to the beams. Fig. 2 is a plan view of a knife.

The cultivator is made in the usual form of the letter A, jointed at the upper point upon a center piece, so that the sides may be opened or closed and held in place by the arcs of circles. The arcs and handles are fastened to a center beam in the usual manner. The knives are made of steel, or have a steel or other equally hard metallic edge, and are made sharp for cutting the soil in thin slices instead of breaking it up into lumps, as is usually done. They are set on the beams at equal distances from each other and from the joint of the cultivator, and at such an angle to the direction of the line of motion, and are so bent and twisted that they shall slightly lift and move the soil, and thus pulverize it in the most effectual manner without packing the soil beneath where they have cut, thus fitting and leaving the soil entirely open for the admission of air and moisture.

First. Our invention is in the form of the side knives or teeth, A A, &c., Fig. 1, which teeth are made of steel, as aforesaid, and formed as if a section cut in the proper direction from the standard and mold-board of a plow, the portion from the standard being used for fastening the knife to the beam of the cultivator. They are also made in pairs of rights and lefts, as shown. They are rounded on the front edge, B, Fig. 2, and drawn and ground sharp on that edge for the purpose of cutting the soil and pulverizing it.

Second. Our invention consists, further, in the manner of setting the side knives or teeth on the beams, so that they shall have a small angle from the line of motion of the cultivator, so that, like a section of the mold-board of a plow, each tooth or knife will cut off, lift, and stir the portion of the soil on which it acts.

Third. Our invention consists, further, in the iron or other metallic chair, C, Fig. 1, one side of which chair is furnished with flanges which clamp the beams of the cultivator, and the other side with flanges transverse to the opposite flanges, and in the proper direction to form a seat, in which the knife is firmly secured, and both the knife and chair are firmly fastened to the beam by the bolt E, Fig. 1, and thereby preventing the beam from splitting, without the use of rivets or bands.

Fourth. Our invention consists, further, in the use of the guide-knife or broad tooth D, Fig. 1, which is rounded and edged like the others, but is not crooked or twisted, nor set at any angle to the line of motion, but is placed as near as may be to the angle formed by the side beams, which broad and straight-set knife acts as the guide to the cultivator, giving it steadiness in its line of motion.

We claim as our invention—

1. The form of the side knives, made of steel, iron, or both combined, as described, and for the purposes hereinbefore set forth.

2. The setting the knives in the manner and for the purposes substantially as hereinbefore set forth.

3. The iron or other metallic chair, substantially as and for the use and purposes hereinbefore set forth.

4. The combination of the broad straight knife in front with the side knives, all made and set substantially as described, with the metallic chairs on the side beams, as described; also the same combination of similar knives set in beams by means of mortises, or otherwise, substantially as and for the purposes hereinbefore set forth.

JOSEPH G. KNAPP.
SAMUEL D. LIBBY.

Witnesses:
SARAH E. LIBBY,
ACHSAH D. LIBBY.